INVENTOR
VICTOR B. COREY

INVENTOR
VICTOR B. COREY

ATTORNEYS

INVENTOR
VICTOR B. COREY
ATTORNEYS

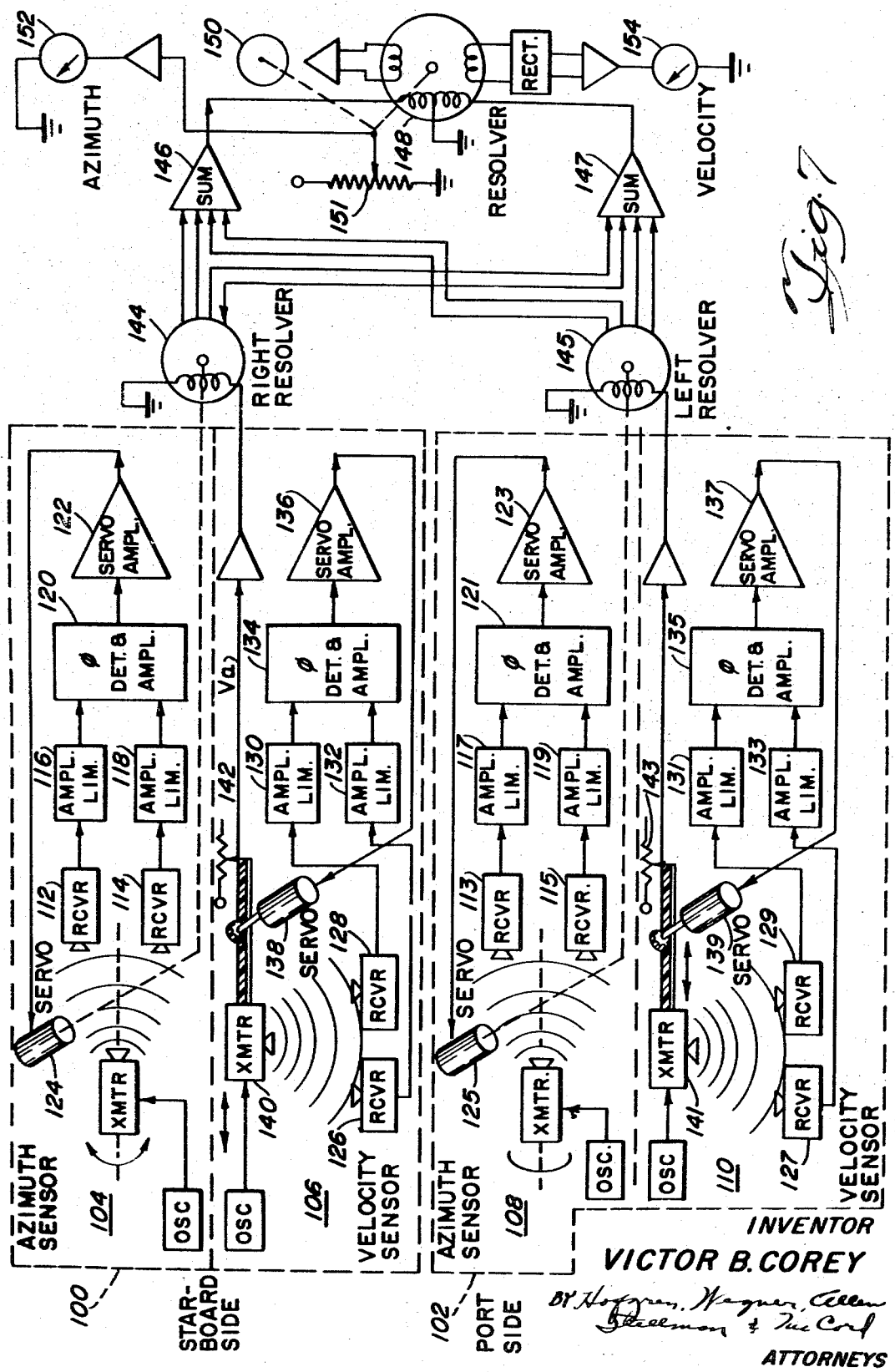

3,605,493
Patented Sept. 20, 1971

3,605,493
DIRECTION AND VELOCITY DETERMINING APPARATUS
Victor B. Corey, Bellevue, Wash., assignor to
United Control Corporation
Original application Mar. 24, 1969, Ser. No. 809,837.
Divided and this application June 29, 1970, Ser.
No. 50,369
Int. Cl. G01c 23/00
U.S. Cl. 73—181                                    5 Claims

ABSTRACT OF THE DISCLOSURE

Detection apparatus for determining the direction and velocity of an incident fluid flow stream. A sonic vibration producing means axially spaced from a sonic vibration detection means is oriented parallel to the direction of flow of the incident fluid flow stream by servo means in order to determine the direction of fluid flow. A second sonic vibration producing means axially spaced from a second sonic detection means and having a common axis at 90° relative to the common axis of the first mentioned means is relatively moved by servo means to indicate velocity of fluid flow. The velocity and direction of flight of a helicopter are indicated by a pair of the above means using circuits which combine the signal outputs to eliminate rotor produced disturbances.

RELATED CASE

This application is a division of my copending application Ser. No. 809,837, filed Mar. 24, 1969, and entitled "Direction and Velocity Determining Apparatus, now Pat. No. 3,548,653.

BACKGROUND OF THE INVENTION

A number of different types of fluid flow stream indicating devices have been heretofore utilized in the prior art as for measuring the speed of an aircraft. Most of these devices utilize a Pitot tube apparatus to compare the difference between ram pressure and static pressure of the incident fluid flow stream, in order to provide an indication of the velocity thereof. The utility of such devices, however, is generally limited to applications wherein the detection apparatus can be directed parallel to the direction at which the moving flow stream intersects the detection apparatus.

Although in some cases means are provided for directing such measuring apparatus into the incident flow stream, this does not necessarily provide an accurate means with which to determine the true air speed of the supporting vehicle for many reasons, including that such apparatus is not capable of discriminating against extraneous flow components. Because of the manner in which the prior detection apparatus functions, and the way in which the apparatus is generally mounted, particularly in the case of a moving vehicle, the sensitivity of prior detection apparatus typically varies widely over the normal range of speed of the vehicle.

Previous apparatus is adequate for some conventional aircraft, although known to be inaccurate at low speeds. However, such apparatus is clearly inadequate in the case of vertical take-off and landing craft (VTOL) and helicopter-type aircraft since in these types of aircraft the direction of travel, particularly at low speeds, may be along axes other than the longitudinal axis of the aircraft.

Furthermore, the flow over a given VTOL aircraft is fairly complex because of the various schemes employed for vertical take-off and landing. The flow around a helicopter likewise is both complex and nonuniform due to the rotor wash.

A still further complication in the case of helicopters is that the flow on both sides of the fuselage is not symmetrical. This asymmetry results from rotational flow induced by the rotor blades and is not constant but varies with load and flight mode, due to their manner of operation. Prior velocity sensors, which rely on pressure, cannot lie in a horizontal plane and be positioned into the complex air flow under a helicopter rotor, and provide meaningful information over a wide range of speeds.

Still another complication in the case of helicopters is that they behave as large pendulous masses which hang from the translating rotors. Thus, if the sensors are fastened to the fuselage the pitch angle must be taken into account in determining the velocity in the azimuthal plane.

SUMMARY OF THE INVENTION

The present invention relates generally to direction and velocity indicating apparatus, and more particularly to a novel direction and velocity indicating apparatus which emits transmissions acted upon by a fluid flow stream.

In many types of modern aircraft the fluid flow conditions in the vicinity of the fuselage are quite irregular and the direction of the flow varies with speed, load, and flight path. In order to make an accurate determination of the forward velocity of the aircraft, it is necessary that means be provided for discriminating between the flow stream components attributable to movement through the air, and those components which are attributable to propwash and turbulence caused by the movement of the fuselage through the air.

In accordance with the present invention an ultrasonic acoustic apparatus, including means for determining the desired direction of travel component and discriminating against the undesirable flow components, is provided along with an ultrasonic acoustic velocity determining apparatus which likewise discriminates against velocity components in directions other than those in the direction of travel of the aircraft.

One advantage of the novel apparatus disclosed herein in accordance with the present invention, is that the novel system delivers a fundamental output which is precisely linear with Mach number (ratio of vehicular velocity to the local value of the velocity of sound in the airstream), from zero through the design range. Zero is measured with complete definiteness just like any other value of air speed.

Another advantage of the present invention is that the measurement of Mach number is performed automatically by the null-finding action of a phase-locked servo loop. In the process, translational mechanical outputs, rotational mechanical outputs and accurate electrical outputs (from synchros or potentiometers) can be generated.

A further advantage of the present invention is that the apparatus can be made responsive to Mach numbers as low as 0.001 (less than 1 knot), and to have essentially uniform resolution throughout its operating range.

Yet another advantage of the present invention is that at any particular value of true air temperature $T_0$, a measurement of Mach number is directly proportional to the measurement of true air speed V, where the constant of proportionality is the velocity of sound, which itself is proportional to $(T_0)^{1/2}$. At any other true air temperature T, Mach number is converted to true air speed through a factor which is the velocity of sound at temperature T, i.e., the velocity of sound at temperature $T_0$ times the factor $(T/T_0)^{1/2}$.

And a further advantage of the present invention is that it makes use of transmissions in the form of continuous wave acoustic energy radiated at an ultrasonic frequency. The narrow band concentration of continuous acoustic energy permits detection of the received signals through well developed techniques of synchronous detection, i.e., selecting only those frequency components from the received signals which have exactly the same frequency as that used to drive the acoustic emitter. Such a technique is advantageous over the use of pulses of acoustic energy, where signal retrieval is made difficult because of the broadband spectral characteristic of pulses, and consequent confusion with the broadband acoustic noise of the operating environment.

Another advantage of the present invention is that transmission and reception of ultrasonic energy takes place at favorable angles, near normal incidence, at all velocities over the design range of measurement. As a result, efficient directive transducers may be employed and the high losses associated with radiation or reception of ultrasonic energy at large angles with respect to the radiating or receiving faces of the transducers are avoided.

Yet a further advantage of the present invention is that accurate air stream velocity measurement is not dependent upon the choice of any particular ultrasonic frequency, or upon the constancy of the frequency employed. Drift of frequency, even during the course of measurement, has no effect on measurement accuracy.

Still another advantage of the present invention is that the apparatus fundamentally discriminates against any air stream velocity component prependicular to the selected plane of measurement. This property may be used to discriminate completely against downwash in measuring the true air speed of helicopters.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

BRIEF DESCRIPTION OF THE DRAWINGS

FIGS. 6A and 6B are vector diagrams illustrating the flow components about the helicopter shown in FIG. 5, in which FIG. 6A shows velocity components of the downwash created by the rotor blade of the helicopter and FIG. 6B illustrates the velocity components about the superstructure of the helicopter; and FIG. 7 is a schematic diagram of a circuit for combining the signals from the apparatus in FIGS. 5 and 6 in order to determine azimuth and velocity of flight of the helicopter.

DESCRIPTION OF THE PREFERRED EMBODIMENT

Figure 1:
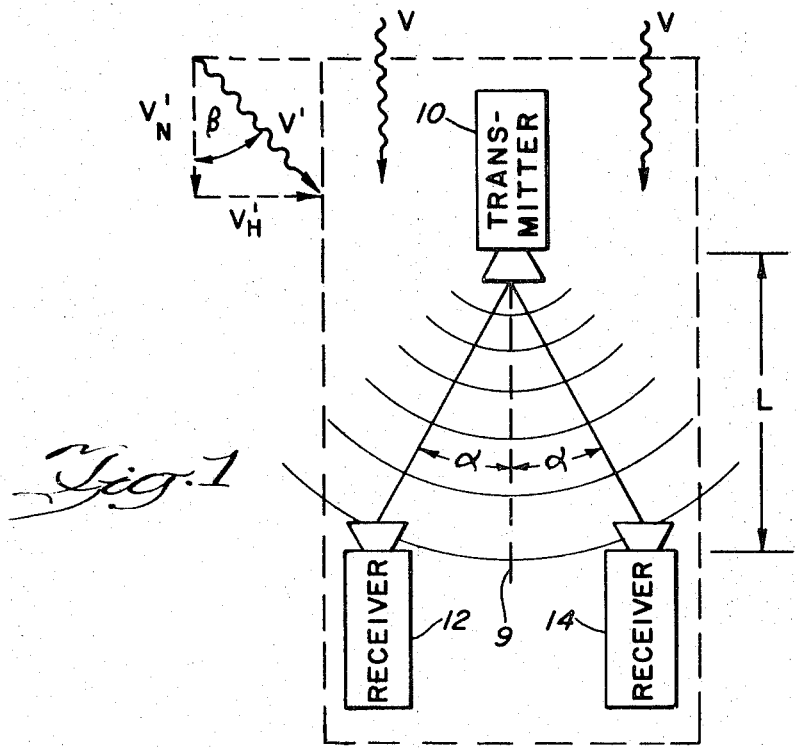
FIG. 1 is a block diagram of the fluid flow stream direction seeking element of the present invention.

To determine the directional component of an incident fluid flow stream lying in a given plane, the apparatus illustrated in FIG. 1 of the drawing is utilized. An acoustic transmitter 10, positioned relative to two receivers 12 and 14 which are axially spaced from the transmitter 10 and symmetrical about the longitudinal axis thereof, as illustrated by dashed line 9, can be used to determine the component of a moving fluid flow stream which lies within the plane defined by the transmitter 10 and two receivers 12 and 14. Under static flow conditions, a transmission of continuous sound of a predetermined frequency emitted from transmitter 10 will propagate at the sonic velocity V through the space separating the transmitter 10 from the receivers 12 and 14, and will be simultaneously received by the respective receivers since the receivers are positioned symmetrically with respect to the axis 9 of transmitter 10 and the transit times thereto are the same.

Likewise, when a moving stream of fluid, such as air, has a directional component lying in the plane determined by the transmitter 10 and receivers 12 and 14, and has a direction parallel to the axis of the transmitter, the signals received by the respective receivers will still arrive simultaneously. The transit times will, however, be increased or decreased depending upon the velocity V and direction of the flow stream component, but because the component is directed parallel to the axis of the transmitter no difference will be apparent between the signals received by receivers 12 and 14.

However, should an incident flow stream V' intersect the space between transmitter 10 and receivers 12 and 14 at an angle $\beta$, as illustrated in FIG. 1, then a sound emitted at time $t_0$ from transmitter 10 still propagates at the sonic velocity across the air gap, but the effective air gap will be changed for both receivers because of the velocity of the intersecting flow stream.

If the new acoustic transit time to receiver 12 is $t_1$, then during the passage of the sound wave from transmitter 10 to receiver 12, the receiver 12 is effectively moved upward by a distance $t_1 V'$ cos $\beta$ and to the left by a distance $t_1 V'$ sin $\beta$. Similarly, during time $t_2$, the new acoustic transit time from transmitter 10 to receiver 14, the receiver 14 is effectively moved upward by a distance $t_2 V'$ cos $\beta$ and to the left by a distance $t_2 V'$ sin $\beta$. However, since $V'/v$ (the Mach number of the incident flow stream) is the same for both acoustic paths, it is clear from the geometry of FIG. 1 that acoustic transit time $t_1$ will be greater than acoustic transit time $t_2$, so that receiver 14 will detect the wave emitted from transmitter 10 at a time earlier than will receiver 12.

In order to restore the equal transit time condition so that the transmitted signal is received simultaneously by receivers 12 and 14, all that need be done is to rotate the transmitter and receiver structure such that the axis of the transmitter 10 lies parallel to the incident flow stream having velocity V'. By providing a servomechanism which is responsive to the phase difference between the signals detected by the receivers 12 and 14, an acoustic direction determining apparatus is thus obtained. By servoing the entire transmitter-receiver structure to null the error signal resulting from the phase difference between the signals received at receivers 12 and 14 the accuracy of this apparatus over prior apparatus is enhanced greatly.

Figure 2:
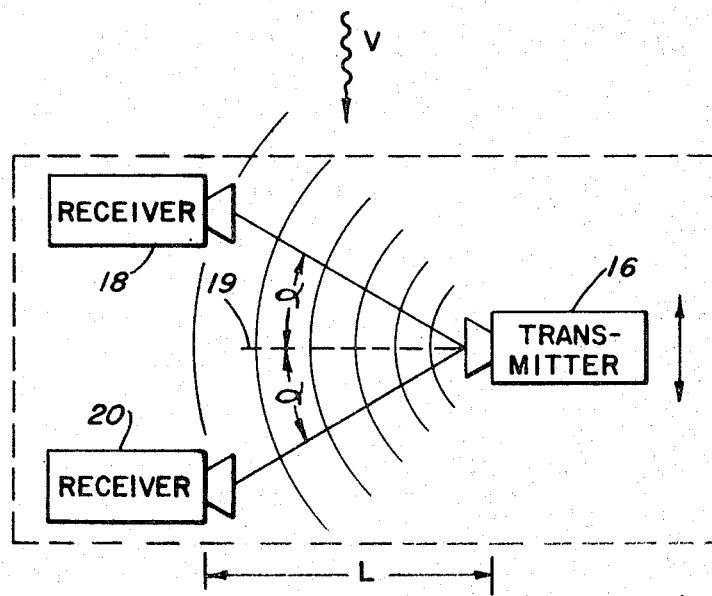
FIG. 2 is a block diagram of the velocity determining element of the present invention.

Referring now to FIG. 2 of the drawing, transmitter-receiver combination is disclosed for velocity determining apparatus. It is known that such combination will measure total velocity in the plane of the transmitter and receiver only when the flow stream is normal to the longitudinal axis of the transmitter, illustrated by dashed line 19. Transmitter 16 has a position which is laterally selectable with respect to a pair of receivers 18 and 20. By directing the structure by servo apparatus to be disclosed, such that the impinging fluid stream is always caused to intersect the axis of the transmitter 16 at an angle of 90° relative thereto, a highly accurate velocity determining apparatus is provided.

As in the previously described embodiment of FIG. 1, when transmitter is positioned along the axis 19 midway between the receivers 18 and 20, sound emitted from the transmitter 16 under static flow conditions, e.g., stagnant air, will propagate across the air gap and be received by the receivers 18 and 20 at the same time. However, when the apparatus is subjected to a flow stream which intersects the axis of the transmitter 16 at 90° relative thereto, and has a velocity V, the receiver 20 will detect the sound at some time earlier than receiver 18 will detect the same sound, and the difference between the respective receptions is proportional to the velocity of the incident flow stream.

In order to determine the velocity using this apparatus at least two different methods could be utilized. One would be to measure the difference between the signals detected by the receivers 18 and 20 in order to determine the velocity V. The other would be to translate the transmitter 16 in the direction of the incident flow stream, relative to the receivers so as to compensate for the sound wave bending which is effected by the incident flow stream.

In the present apparatus, the later method has been chosen as the preferred manner of determining the flow stream velocity. Mach number M, the ratio of air stream velocity to the velocity of sound, is directly proportional to the distance through which it is necessary to move transmitter 16 upstream in order to maintain equal transit times at receivers 18 and 20. This result is obtained for the following reason. When the velocity V is imparted to the air, this can be regarded as imparting the velocity V in the opposite direction to two walls separated by distance L, one wall containing the line between the receiving points of receivers 18 and 20 and the other wall containing a line parallel to the first line and including the emitter point of transmitter 16, with stagnant air between them. The sonic wave emitted at time $t$ from transmitter 16 still propagates with the sonic velocity $v$ across the air gap L. However, in the time it now takes to cross the gap $L_{sec}\alpha/v$, the receivers 18 and 20 have moved ahead by the distance $$V \times \frac{L_{sec}\alpha}{v}$$

which in turn is equal to $M \times L_{sec}\alpha$. To restore an equal transit time condition, transmitter 16 may be moved a distance ahead, that is, upstream, by the distance $$M \times L_{sec}\alpha$$

to anticipate the fact that the transit time to receiver 18 is lengthened and the transit time to receiver 20 is shortened by the presence of velocity V. Since $L_{sec}\alpha$ is a constant fixed by the geometry of the apparatus, the result is that by shifting the transmitter 16 forward by an amount necessary to maintain equal transit times at receivers 18 and 20 (zero phase difference), the amount of motion is a direct measure of the Mach number M of the incident flow stream.

By utilizing a servo mechanism to null the phase difference between the signals received by the two receivers 18 and 20, the accuracy of the null method is preserved in an instrument which performs the measurement of Mach number linearly and automatically.

This apparatus of FIG. 2 offers certain important advantages which facilitate its use on both VTOL aircraft and helicopters since it is insensitive to flow stream velocity components perpendicular to the plane determined by the position of the receivers 18 and 20 and the transmitter 16, i.e., an azimuthal plane. However, this advantage can only be realized if axis 19 is maintained at all times perpendicular to the airstream velocity, which applicant's structure accomplishes as will be explained. By mounting such velocity determining apparatus alongside the fuselage of a helicopter apparatus with the sensitive (azimuthal) plane lying parallel to the helicopter rotor, the velocity determining apparatus will be completely insensitive to the vertical downwash component caused by the helicopter rotor. Because of the tangential component of flow in the sensitive plane of the velocity detection apparatus, caused by the rotation of the rotor, one of applicant's devices is provided on each side of the fuselage and the detected outputs thereof are compared as will be disclosed in order to cancel the rotor induced velocity component and provide an accurate determination of forward air speed. Likewise, the apparatus can be mounted on the tail of a VTOL aircraft so as to discriminate against velocity components in directions not related to the flight path of the aircraft, and which are caused by the complex nonuniform flow conditions about the aircraft.

Figure 3:
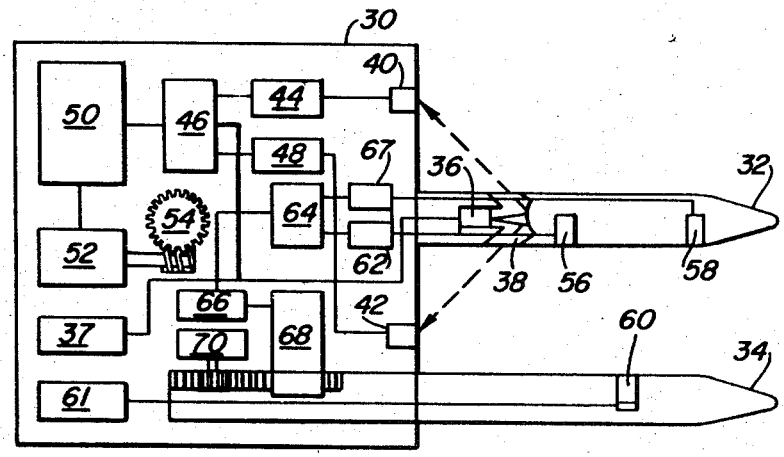
FIG. 3 is a partly block and partly schematic diagram combining in a preferred embodiment the direction seeking and velocity determining elements of FIGS. 1 and 2.

Since it is necessary that the velocity determining apparatus of FIG. 2 have its sensitive axis directed generally parallel to the incident fluid flow stream, a combination of that apparatus and the direction determining apparatus illustrated in FIG. 1 provides a very useful velocity and direction determining system having many areas of utility. Referring now to FIG. 3 of the drawing, a preferred embodiment of a velocity and direction determining apparatus is illustrated. The apparatus includes an aerodynamically-shaped instrument housing 30, from the leading edge of which projects rod-shaped transmitter and receiver housing means 32 and 34. A transmitter 36 is disposed within the housing 32 which has provided therein sonic deflector means and outlet ports 38 for directing sound waves at an angle relative to the tubular projection 32 toward a pair of sonic detectors 40 and 42 which are mounted in the leading edge of the instrument housing 30. The transmitter 36 is energized by an oscillator 37 which is operatively coupled thereto. The accuracy of the measurement function is not affected by the detailed means of sonic reflection. The illustrated feature is employed to improve efficiency by causing more sound energy to be radiated in the general direction of the receivers, while still preserving a favorable aerodynamic shape.

The receiver 40 is operatively connected to an amplifier and limiter means 44, the output of which is connected to a phase detector 46. Likewise, the receiver 42 is operatively connected to an amplifier and limiter 48, the output of which is also connected to phase detector 46. Oscillator 37 is also coupled to phase detector 46 to provide the necessary information for synchronous detection of the signals from detectors 40 and 42. The output of the phase detector 46 is amplified by a servo amplifier 50 which drives the servo means 52 for causing the housing 30 to be rotated about the supporting shaft 54.

To determine the direction of the incident flow stream, the entire housing means 30 is servoed until an error signal, due to a phase difference detected in receivers 40 and 42, is nulled out at which time the apparatus is known to be directed into the flow stream and coaxial with the flow direction thereof, as previously described with reference to the apparatus discussed in FIG. 1.

Also mounted in the tubular projection 32 are a pair of receivers 56 and 58 which are mounted opposite a transmitter 60 located in the tubular projection 34. The transmitter 60 is energized by an oscillator 61 which is operatively coupled thereto. The receiver 56 is operatively connected to an amplifier and limiter 62, the output of which is coupled to a phase detector 64. Likewise, the receiver 58 is coupled to an amplifier and limiter 67, the output of which is also coupled into phase detector 64. The output of phase detector 64 is fed through a servo amplifier 66 to a servo drive mechanism 68 which causes the tubular projection 34 to be axially displaced in order to move the transmitter 60 into a position which will enable a null to be detected between the outputs of the receivers 56 and 58.

As described with reference to FIG. 2, the position of the transmitter 60 is directly proportional to Mach number of the incident flow stream. In order to provide an electrical signal which is responsive to the position of the transmitter 60 with respect to the receivers 56 and 58, a potentiometer means 70 is provided having a drive means which is coupled to the tubular member 34 so as to vary the position of the contact arm thereof in response to the axial positioning of the transmitter 60 as the tube 34 is axially displaced. The output of the potentiometer is connected to a remotely disposed indicator means (not shown).

Figure 4:
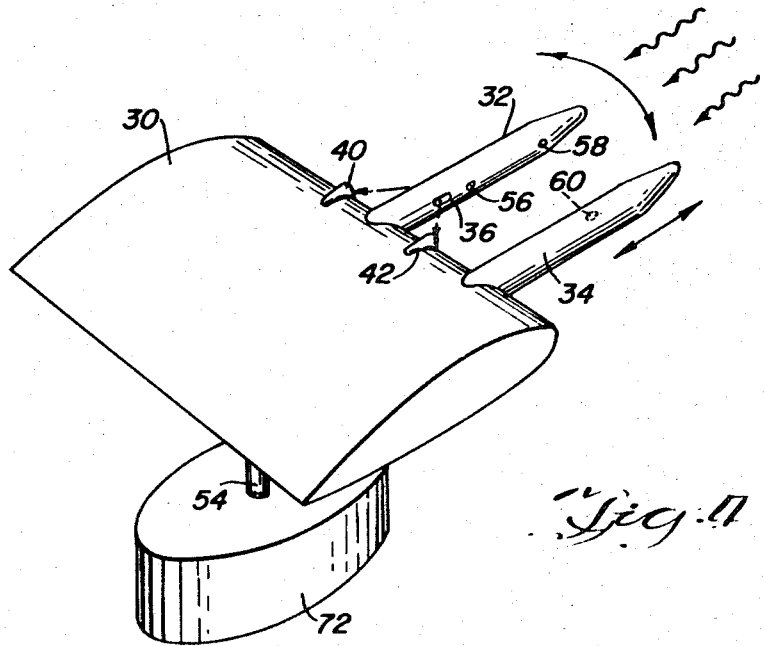
FIG. 4 is a perspective view showing the embodiment of FIG. 3 contained in an aerodynamic housing.

In FIG. 4 of the drawing, the direction and velocity determining apparatus of FIG. 3 is further illustrated showing a typical housing configuration and method of mounting the apparatus. In this embodiment, a base 72 is shown to which one end of the shaft 54 is affixed. The base 72 may be any appropriate portion of an aircraft fuselage or wing, or may be a projection from any portion of the aircraft. The housing 30 houses the components illustrated in FIG. 3. As the housing 30 is servoed in the azimuthal plane normal to the shaft 54, the detectors 40 and 42 will be subjected to sonic vibrations emanating from transmitter 36. So long as the tubular housing member 32 is not pointed directly into the flow stream component which lies within the aforementioned plane, a difference in signal will be detected by the receivers 40 and 42 for the reasons discussed above with reference to FIG. 1. The apparatus is therefore servoed until a null is detected by the phase detector 46 indicating that the projection 32 is pointed in the direction of the incident flow component.

Once the apparatus is aligned with the flow stream, the velocity detection apparatus, which consists of the receivers 56 and 58 and transmitter 60, are operative to indicate the Mach number of the incident flow stream. This is accomplished by servoing the position of the projection 34 until a null is detected by detector 64 which is responsive to the outputs of receivers 56 and 58. The null is obtained by axially displacing the tubular members 34 in accordance with the procedure described with relation to FIG. 2. The position of the transmitter 60 with relation to the receivers 56 and 58 therefore provides an electrical signal which operates a remotely located indicator means so as to give a true indication of the velocity in terms of Mach number.

Figure 5:
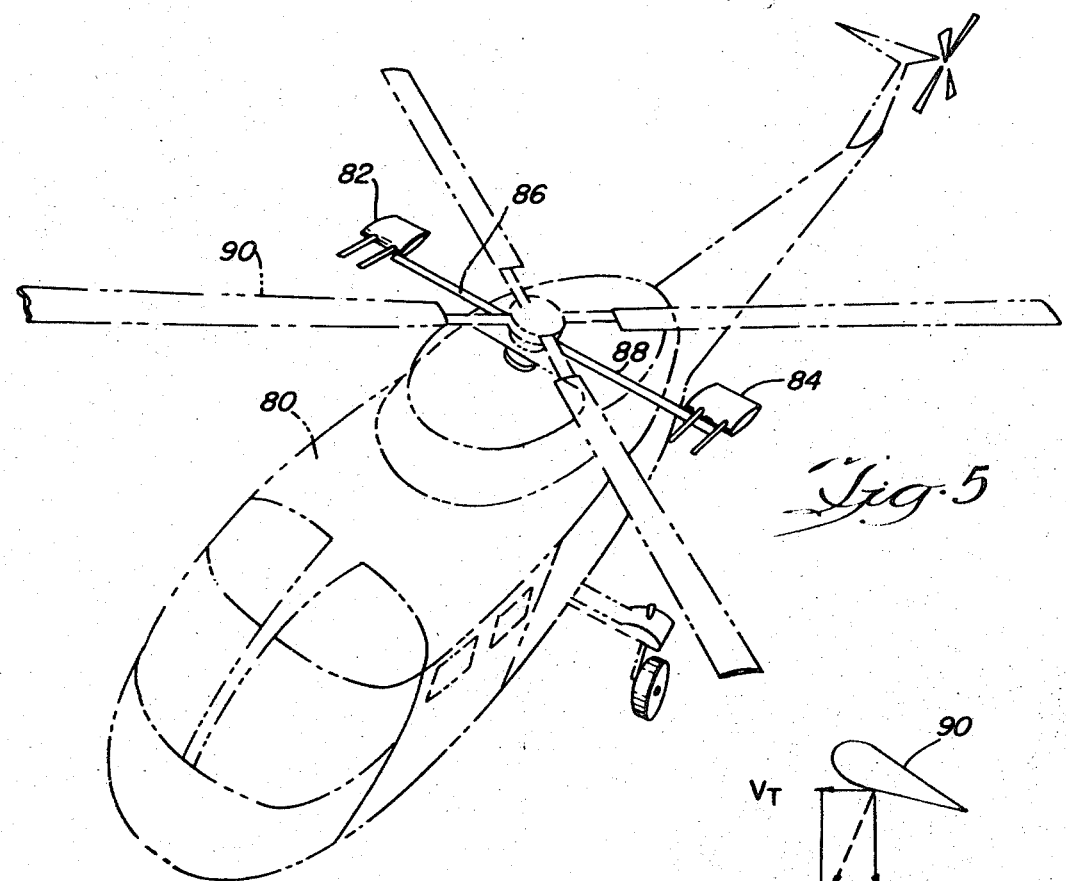
FIG. 5 is a perspective view of a pair of the direction and velocity determining apparatus of FIGS. 3 and 4 as mounted on a helicopter.

Referring now to FIGS. 5 through 7 of the drawing, a preferred embodiment of the invention is described suitable for determining a characteristic associated with airflow about a helicopter. Such characteristics of airflow can be direction and velocity of the airflow. In FIG. 5, a helicopter structure 80 is generally illustrated. Since the fluid flow conditions on either side of the helicopters are influenced by the downwash of the rotor so as to introduce flow components in the direction parallel to the axial direction of the rotor shaft as well as tangential thereto, a pair of the velocity and direction sensing devices described above are required, one on each side of the helicopter superstructure.

As illustrated, the two devices 82 and 84, are suitably located, one on each side of the helicopter, on two nonrotating booms 86 and 88 which are positioned below the rotor but above the fuselage by a distance of at least 20% of the rotor blade radius. This is to avoid any effect which the fuselage proper might have on the incident flow stream. The two devices, 82 and 84, are mounted so that they may be individually oriented in the azimuthal plane, parallel to the plane of the rotor 90, about axes parallel to the rotor axis and passing through the outer ends of the fixed booms 86 and 88.

Figure 6A:
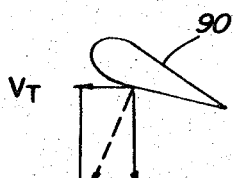
Figure 6B:
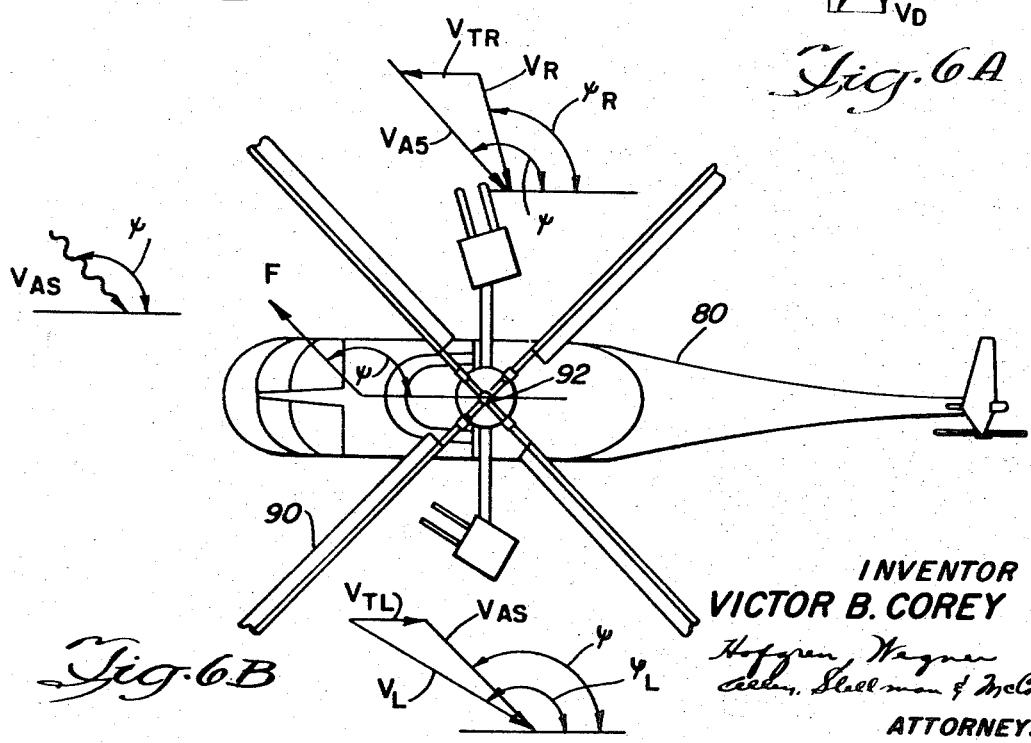

In FIGS. 6A and 6B, the reason why two detector devices are required in the helicopter application is illustrated. FIG. 6A illustrates the vertical downwash (normal to the plane of the rotor) and horizontal (tangential) components $V_D$ and $V_T$ respectively, of the downwash created by the rotor blade 90. Since the detection apparatus of the present invention is insensitive to the vertical component $V_D$ only the tangential component $V_T$ requires consideration. It is the component $V_T$ which requires that two detector devices be utilized in the helicopter application.

When the helicopter is traveling in a direction F, FIG. 6B, which is at an angle $\psi$ to its longitudinal axis, it will intersect a flow stream which is directed as shown by the airspeed velocity arrow $V_{AS}$. As the flow stream, having $V_{AS}$ passes under the rotor 90 it will be subjected to a downwash airflow which has a component $V_D$ parallel to the rotor shaft 92, and a component $V_T$ which is tangential to the rotor travel at any given position beneath the rotor. And since the detection apparatus of the present invention discriminates against velocity components normal to its axis of rotation, the component $V_D$ parallel to the rotor shaft 92 may be disregarded. However, as mentioned above, the tangential component $V_T$ cannot be disregarded since it adds with the velocity vector $V_{AS}$ to form the resultant velocity vector which must be sensed by the detector apparatus.

As shown in the drawing, the tangential velocity vector $V_{TR}$ on the right side of the fuselage 80 combines with the flow stream direction vector $V_{AS}$ to provide a resultant vector $V_R$ which is at an angle $\psi_R$ relative to the longitudinal axis of the fuselage 80. However, on the left side of the fuselage 90, the velocity vector $V_{TL}$ is 180° out of phase with the like component on the right side and adds with the flow stream vector $V_{AS}$ to form a resultant vector $V_L$ which is at an angle of $\psi_L$ relative to the longitudinal axis of the fuselage 80. Since the resultant vectors $V_R$ and $V_L$ are the sum of the vectors $V_{AS}$ and $V_{TR}$, and $V_{AS}$ and $V_{TL}$ respectively, by adding these vectors and dividing by two, the true airspeed velocity $V_{AS}$ can be determined.

In order to sense the resultant velocities and directions of flow on either side of the craft and then correlate the two to provide a single velocity indication and azimuth indication, a system such as that diagrammatically illustrated in FIG. 7 may be utilized. In this figure, the box designated 100 encircles the components of the detection apparatus on the starboard side of the aircraft and the box designated 102 encloses the components of the like apparatus disposed on the port side of the aircraft. The boxes 100 and 102 are further subdivided into sub-boxes 104, which is the azimuth sensor on the starboard side; 106, which is the velocity sensor on the starboard side; 108, which is the azimuth sensor on the port side; and 110, which is the velocity sensor on the port side. The boxes 100 and 102 are representative of the apparatus illustrated in FIG. 3, and incorporate the sonic detection and velocity indicating mechanisms which are basically described with reference to FIGS. 1 and 2.

In operation, the outputs of the receivers 112 and 114, and 113 and 115 of the azimuth sensors 104 and 108 respectively, are first amplified by amplifier-limiters 116 and 118, and 117 and 119 respectively and are then compared in the phase detector sections 20 and 121 respectively, each consisting of a zero-crossing detector and a flip-flop averaging circuit. The averaging circuit outputs are then amplified and buffered by servo amplifiers 122 and 123 respectively, to drive the servos 124 and 125 for aligning the sensitive axis of detectors 100 and 102 with the incident flow streams. The motors 124 and 125 drive the entire transmitter rack until the detected phase differences vanish. When no phase differences are detected by the detectors 120 and 121, the signals provided by the velocity sensors 106 and 110 are accurate indications of the flow stream velocities.

The outputs of the receivers 126 and 128, and 127 and 129 of the velocity sensors 106 and 110 respectively, are first amplified by amplifier-limiters 130 and 132, and 131 and 133 respectively, and are then compared in the phase detector sections 134 and 135 respectively, each consisting of a zero-crossing detector and flip-flop averaging circuit. The averaging circuit outputs are then amplified and buffered by servo amplifiers 136 and 137 respectively to drive the servo motors 138 and 139. These motors cause the transmitters 140 and 141 to be repositioned relative to the receivers 126 and 128, and 127 and 129 respectively, until the detected phase differences vanish, at which time the positions of the respective transmitters are related to the velocity of the incident flow streams.

Potentiometers 142 and 143 follow the repositioning of the transmitters 140 and 141 and produce output signals proportional to $V_R$ and $V_L$ respectively. These output signals are then respectively impressed across the rotor windings of the resolvers 144 and 145, the rotors of which are driven in response to the motion of servos 124 and 125 respectively. The resolvers 144 and 145 thus produce $z \sin \theta$ and $z \cos \theta$ outputs for both sides, the like components of which are then summed in adding networks 146 and 157 and fed to a third resolver 148, the rotor of which is driven by a motor 150 responsive to one winding of the resolver 148.

The motor 150 is geared to a potentiometer 151 which provides an output at indicator 152 which is responsive to the average detected angle $\psi_R - \psi_L$. A signal responsive to the average velocity magnitude appears across another winding of the resolver 148 and is rectified and amplified to provide a velocity indication in terms of Mach number at the indicator 154.

A temperature controller is required in each detector so as to maintain the transmitters and receivers at a temperature to prevent ice formation. Heater coils are distributed in the two tubular projecting members of each detector as well as in the airfoil.

In the embodiment used in a VTOL or V/STOL aircraft, only one such velocity and direction detection device is required, and it would be typically mounted above the tail structure. In that application, however, since no vector addition is required, the resolvers would typically be replaced by synchros.

I claim:
1. Apparatus for determining airflow information associated with the flight of aircraft having nonuniform velocity of airflow about the aircraft caused by the effect of a rotor which produces velocity components acting in a plane parallel to the plane of the rotor and normal to the parallel plane, said velocity component combining with the actual velocity of the airflow to produce said nonuniform velocity of airflow, comprising:
a first airflow determining device extending from said aircraft and mounted to respond to velocities occurring in said plane and discriminate against said normal velocities, said first device having a first signal output representative of a characteristic of the planar velocity of the airflow thereabout;
a second airflow determining device extending from said aircraft and spaced from said first device by a predetermined angle in said plane, said second device being mounted to respond to velocities occurring in said plane and discriminate against said normal velocities, said second device having a second signal output representative of a characteristic of the planar velocity of the airflow thereabout; and
means for combining said first signal and said second signal in a manner determined by said predetermined angle in order to cancel the effect of the rotor produced planar velocity component from a resultant signal output, said resultant signal output indicating the characteristic of the actual velocity of airflow with respect to the flight of the aircraft.

2. The apparatus of claim 1 in which the airflow information corresponds to the direction of the actual velocity of airflow, wherein said first and second devices each include an element rotatable in said plane and servo means for rotating said element until a direction responsive portion thereof is parallel with the direction of the planar velocity of airflow at that device, and said combining means averages said first and second signals to eliminate the direction of rotor produced planar velocity of airflow from the resultant signal output, said resultant signal output thereby indicating the direction of flight of the aircraft.

3. The apparatus of claim 1 in which the airflow information corresponds to the actual velocity of flight of the aircraft, wherein said first and second devices each include transmitter means for emitting transmissions along an axis exposed to the airflow, receiver means axially spaced from the transmitter means for detecting the transmission, and servo means for rotating the orientation of said axis until said axis is generally perpendicular to the planar velocity of airflow at that device, said combining means summing said first and second signals to cancel the rotor generated planar velocities from the resultant signal output, said resultant signal output thereby indicating the actual velocity of flight of the aircraft with respect to the surrounding airflow.

4. The apparatus of claim 1 wherein said first and second devices extend from directly opposite portions of the aircraft, both of said first and second devices being located on the periphery of a circle having a center corresponding to the axis of rotation of the rotor to cause the signal output of each device to include a rotor produced planar tangential velocity component which is equal in amplitude but opposite in direction to the component from the other device, said combining means summing said first and second signals to cancel the rotor produced tangential velocity component, said resultant signal output thereby indicating the actual velocity of airflow.

5. The apparatus of claim 4 in which the characteristic of the airflow is both the direction and velocity of the airflow, wherein said first and second devices each include velocity determining means having transmissions along an axis movable with respect to and exposed to the airflow, the velocity determining means detecting the deviation of the transmissions when the airflow is generally perpendicularly incident thereagainst to produce a velocity signal output, direction determining means for producing an indication of the direction of the incident airflow, and servo means responsive to the indication for moving the axis of said velocity determining means until said axis is generally perpendicular to the direction of the airflow,
resolver means responsive to the velocity signal outputs and the direction indications of the first and second devices, and
means for providing a summation of outputs from said resolver means and for applying the resultant summations to additional resolver means which provides output signals indicating the direction and velocity of flight of said aircraft.

References Cited

UNITED STATES PATENTS 3,028,578   4/1962   Stanton _____ 73—178HUX

DONALD O. WOODIEL, Primary Examiner

U.S. Cl. X.R.

73—178H